No. 740,860. PATENTED OCT. 6, 1903.
W. S. HOWLAND.
BRAKE MECHANISM FOR CARS.
APPLICATION FILED MAY 26, 1903.
NO MODEL. 3 SHEETS—SHEET 1.
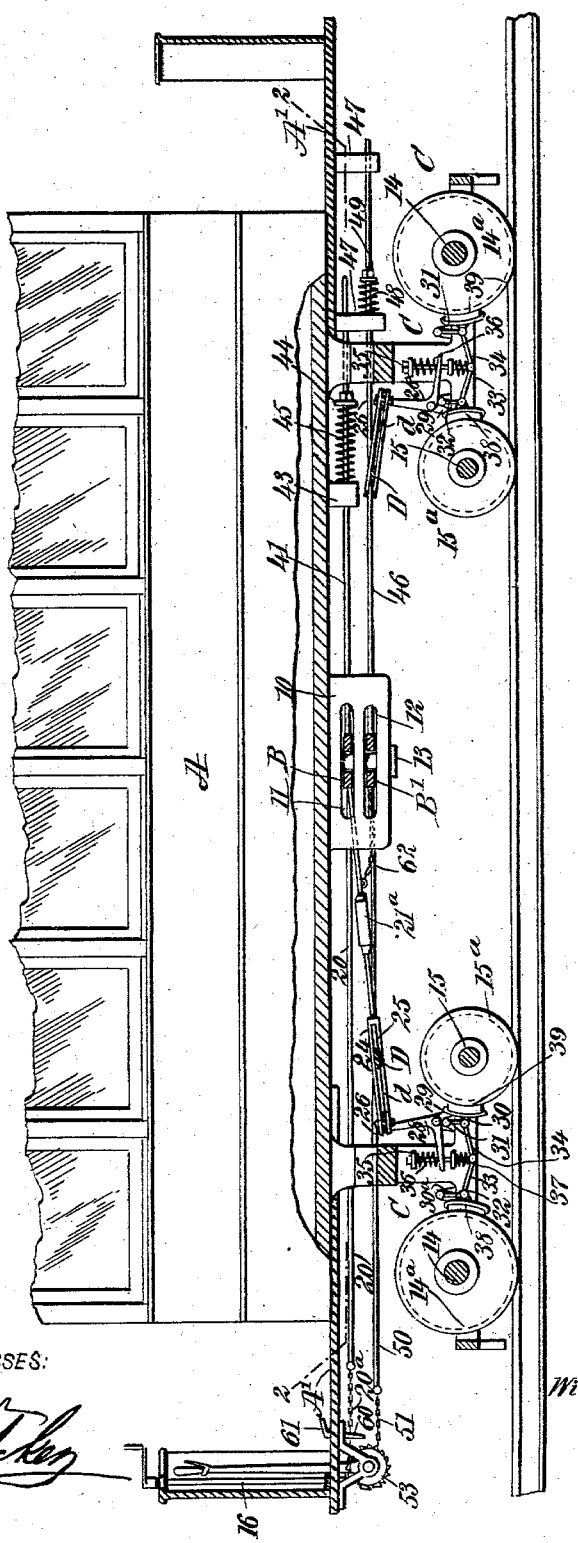
WITNESSES:
INVENTOR
William Shipman Howland
BY
ATTORNEYS.

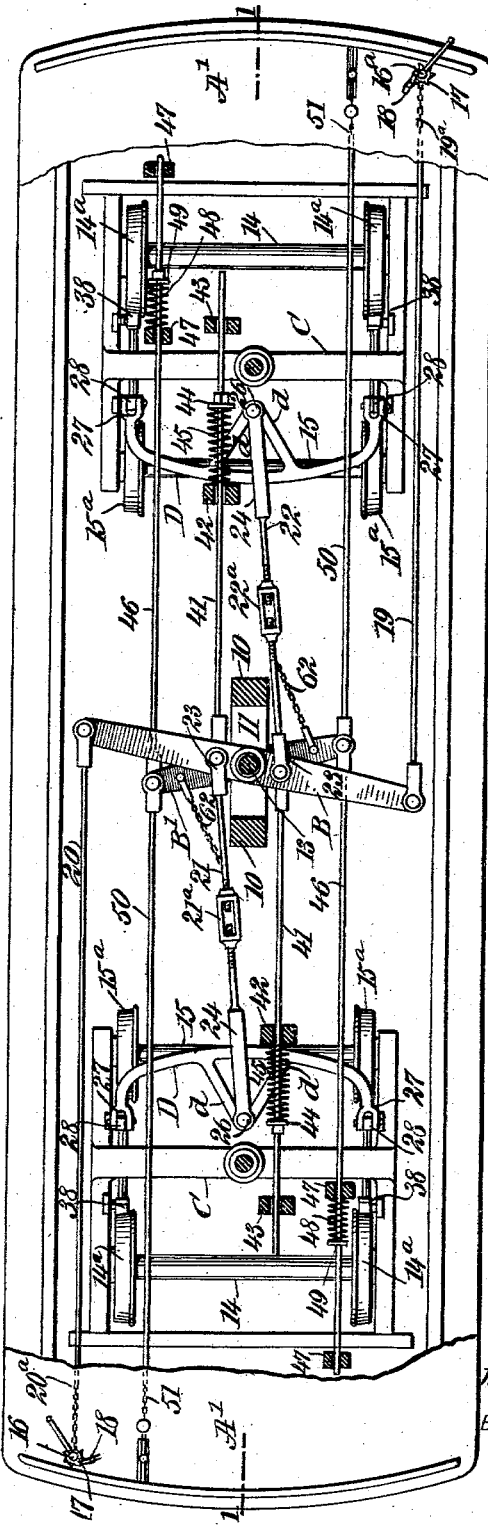

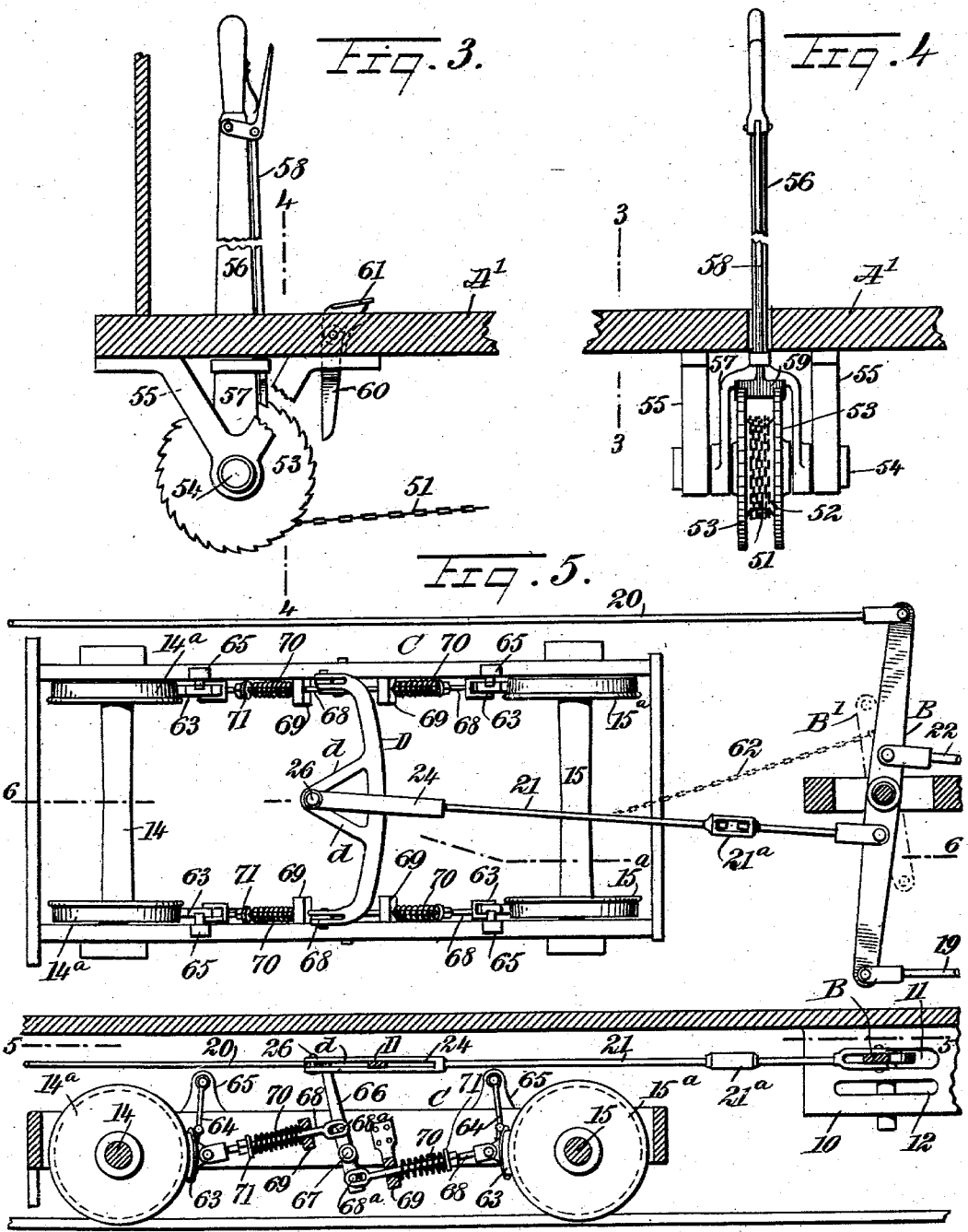

No. 740,860. Patented October 6, 1903.

UNITED STATES PATENT OFFICE.

WILLIAM SHIPMAN HOWLAND, OF OLD SAYBROOK, CONNECTICUT.

BRAKE MECHANISM FOR CARS.

SPECIFICATION forming part of Letters Patent No. 740,860, dated October 6, 1903.

Application filed May 26, 1903. Serial No. 158,798. (No model.)

*To all whom it may concern:*

Be it known that I, WILLIAM SHIPMAN HOWLAND, a citizen of the United States, and a resident of Old Saybrook, in the county of Middlesex and State of Connecticut, have invented a new and Improved Brake Mechanism for Cars, of which the following is a full, clear, and exact description.

The purpose of the invention is to provide an improved brake mechanism for cars which includes main and supplemental or emergency devices for controlling the brake-shoes, the construction of both devices being simple, durable, and economic, applicable to any car, and such that the main brake device may be used independently of the emergency brake device whenever desired, and whereby the supplemental or emergency brake mechanism may be almost instantly applied to the brake-shoes to add to the gripping power of said brake-shoes upon the wheels for the purpose of stopping the car instanter even upon a decided downgrade.

A further purpose of the invention is to reverse the usual operation in the manner of controlling brakes and to provide brake-shafts or their equivalents, levers, and tension-controlled connections between the brake-shafts and the brake yokes or beams whereby when a brake-shaft or its equivalent is turned or moved in one direction the tension devices will be brought under tension and the brake-shoes will be carried away from the wheels and will be so held by the application of any approved locking devices to the brake-shafts or the equivalent mechanism employed, whereby when the brakes are to be applied it is simply necessary to disconnect the locking devices from the brake-shafts or equivalent controlling means employed, at which time the tension devices will immediately and automatically act to force the brake-shoes to locking engagement with the wheels.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional side elevation of a portion of a car and the improved brake mechanism, the main brake mechanism being applied and the auxiliary brake mechanism held out of action with reference to the wheels. Fig. 2 is a horizontal section through the car just below the flooring, the platforms being shown in plan and the parts being in the position shown in Fig. 1. Fig. 3 is a detail sectional view of the platform of a car and a side elevation of the device employed for controlling the emergency-brakes, the section being taken on the line 3 3 of Fig. 4. Fig. 4 is a section taken practically on the line 4 4 of Fig. 3. Fig. 5 is a sectional plan view of a truck and main brake mechanism carried thereby, illustrating the manner in which the tension devices for the brakes may be located upon the truck, the section being taken practically on the line 5 5 of Fig. 6; and Fig. 6 is a section taken substantially on the line 6 6 of Fig. 5.

A represents the body of a car, and A' the platforms of the same, the platforms being provided with the usual fenders or upright aprons. At the central portion of the bottom of the car a bracket 10 is located, which bracket extends downward and is open at both of its ends. It is provided in its sides with upper slots 11 and lower slots 12, longitudinally produced, as is shown in Fig. 1. The operating-lever B for the main brakes is passed through the upper slots 11 in the bracket 10, extending in direction of the sides of the car, and below the brake-operating lever B a second operating-lever B' is likewise located in the bracket 10, extending through the lower side slots 12. The lower brake-operating lever B' is usually shorter than the upper main operating-lever B; but their pivot is centrally located, and the pivot for the two levers is in the form of a pin 13, which is passed centrally downward through the bracket 10 and through suitable openings in the central portions of the upper and lower brake-operating levers B and B'. The lower brake-operating lever B' is adapted to operate the emergency mechanism when such is required to be brought into play.

In Figs. 1 and 2 the main brakes are shown as applied and the emergency or supplemental mechanism as out of operative engagement with the wheels of the car, and under such circumstances as is shown in Fig. 2 the operating-lever B for the main brake is at an angle to the operating-lever B' for the supplemental or emergency brake; but when both the supplemental or emergency mechanism and the main brakes are carried away from the wheels of the car the two levers B and B' are substantially parallel one over the other.

Any desired form of trucks C may be employed to support the body of the car, and each truck, as is usual, is provided with an outer axle 14 and an inner axle 15, the outer axle having wheels 14$^a$ secured thereto and the inner axle wheels 15$^a$, as is shown in both Figs. 1 and 2.

At opposite sides of the platforms A' of the car the usual upright brake-shafts 16 and 16$^a$ are shown located, and each brake-shaft 16 and 16$^a$ above the platform is shown provided with a ratchet-wheel 17, the teeth of which are adapted to be engaged by pawls 18, likewise located at the upper portion of the platform, which pawls may be moved to or from the ratchet-wheels 17 by the foot of the motorman or the director of the vehicle.

A connecting-rod 19 is pivotally connected with one end of the brake-operating lever B, and the said connecting-rod is carried in direction of the brake-shaft 16$^a$, and at its outer end has a chain 19$^a$ attached, adapted to be wound around the brake-shaft 16$^a$ in the customary manner. A second connecting-rod 20 is pivotally attached to the opposite end of the upper operating-lever B, which connecting-rod 20 is carried in direction of the opposite end of the car and at its outer end has an attached chain 20$^a$, adapted to be wound around the brake-shaft 16, as is shown in Fig. 2. Actuating-rods 21 and 22 are pivoted at their inner ends, as shown at 23 in Fig. 2, to the said main-brake-operating lever B, one at each side of the center of the said lever and preferably near its pivot 13, as is also shown in Fig. 2. Both of the actuating-rods 21 and 22 are preferably made in two sections, as is shown in Fig. 2, the sections of the actuating-rod 21 being connected by a turnbuckle 21$^a$ and the sections of the rod 22 by a turnbuckle 22$^a$. At the outer end of each actuating-rod 21 and 22 an enlarged section 24 is formed or secured, which enlarged sections are provided with longitudinal slots 25 between their upper and their lower faces, as is best shown in Fig. 1.

In connection with the slotted outer terminal 24 of each actuating-rod 21 and 22 a brake yoke or beam D is employed, the said brake yoke or beam being horizontally located and is supported in suitable hangers from the body of the car, and the said brake yokes or beams are free to slide in their supports. The brake yokes or beams D are so placed that their terminals face in direction of opposite ends of the vehicle, as is shown in Fig. 2, and the body portions of the said brake-yokes D are held to slide in the slots 25, produced in the outer terminals 24 of the actuating-rods 21 and 22.

Arms $d$ extend outwardly from the outer longitudinal edges of the brake yokes or beams D, which arms are brought together at their outer ends, as is shown in Fig. 2, and the connected arms $d$ are pivoted by suitable pins 26 at the outer end portions of the enlarged terminals 24 of the actuating-rods 21 and 22. Each brake yoke or beam D is provided at its ends with a socket 27, which sockets extend in direction of the ends of the vehicle, and in each socket 27 the upper end of an elbow-lever 28 is pivoted, which elbow-levers 28 are fulcrumed upon uprights 29 from the sides of the trucks C, for example, adjacent to the inner wheels 15$^a$.

Between the wheels 14$^a$ and 15$^a$ of a truck, at each side of said truck, posts 30 and 30$^a$ are located, extending in an upward direction. A link 31 extends downward from each post 30, being pivotally attached to said post, which links are at the inner sides of the trucks, and a link 32 extends downward from each of the posts 30$^a$, likewise at the inner side of the truck. The links 31 and 32 are connected by links 33 and 34, which links 33 and 34 are pivotally connected with each other and to a rod 35, adapted to slide in a bearing and having a head at its upper end. The bearings are all on the pedestals of the truck C, as is shown in Fig. 1. These rods 35 on the said pedestals pass loosely through openings in the lower members of the elbow-levers 28, and springs 36 are coiled around the rods 35 between the heads of the rods and the upper faces of the horizontal members of the elbow-levers 28, while kick-springs 37 are also coiled around the rods 35 between the bearings and where the lower links 33 and 34 connect with said rods.

A brake-shoe 38 is attached to each of the links 32, adapted for engagement with the wheels 14$^a$ of the trucks, and a corresponding brake-shoe 39 is attached to each link 31, adapted for engagement with the peripheral surfaces of the wheels 15$^a$ of the trucks, as is also best shown in Fig. 1. Thus it will be observed that when the elbow-levers 28 are raised the links 33 and 34 are carried upward by reason of the horizontal members of the elbow-levers 28 engaging with the bottom portions of the springs 36, and in proportion to the extent that the links 33 and 34 are straightened the bearing of the brake-shoes will be more or less positive on the periphery of the wheels.

The brakes are removed from engagement with the wheels 14$^a$ and 15$^a$ of the trucks by operating the brake-shafts 16 and 16$^a$ through the following connections, it being understood that one brake-shaft is loose while the other is in operation.

Controlling-bars 41 are pivotally attached to the main-brake-operating lever B at a point below the pivotal connection 23 of each of the actuating-rods 21 and 22 with said main brake-lever B, as is illustrated in Fig. 2. These controlling-bars extend in opposite directions or in direction of opposite ends of the car and pass freely through bearings 42 and 43, supported in any suitable or approved manner from the bottom of the car. Between these bearings 42 and 43 each controlling-bar 41 is provided with a collar 44, secured to said bar, and a spring 45 is coiled around each controlling-bar 41, engaging with the collars 44 of the bar and the inner bearing 42, as is also best shown in Fig. 2.

When the brake-shoes are to be released by the main brake mechanism, one of the brake-shafts 16 or 16$^a$ is turned so as to wind the chain connected with either the connecting-bar 19 or 20 on the said brake-shaft, thus carrying the main brake-lever B to the position shown occupied by the emergency-operating brake-lever B', (shown in Fig. 2,) at which time the springs 45 on the controlling-bars 41 will be placed under tension and the actuating-rods 21 and 22 will be forced outward, thus causing the lower members of the elbow-levers 28 to drop, permitting the rods 35 to drop also, releasing the spring 36 from tension, and the kick-springs 37 will also be released from tension and acting in a downward direction will force the connecting-points of the links 33 and 34 downward, thus carrying the brake-shoes away from the wheels. The operating-brake shaft is then locked, and when it is desired to apply the main brakes it is simply necessary to release such shaft from its locking medium, whereupon the springs 45 on the controlling-bars 41 will immediately expand and will draw the main-brake-operating lever B to the position shown in positive lines in Fig. 2, and such lever in assuming such position will draw the brake yokes or beams D in direction of each other, thereby rocking the elbow or bell-crank levers 28 in such manner as to raise their lower or horizontal members and carry the rods 35 upward, straightening out the links 33 and 34 and causing an instant application of the brake-shoes to the wheels of the vehicle.

Many occasions arise when it is very desirable that an emergency-brake should be at hand or a means for doubling the efficiency of the brake-shoes. This I accomplish without providing auxiliary brake-shoes, as the auxiliary means for doubling the power are applied almost direct to the single brake-shoes employed. The construction controlling the emergency or supplemental braking action is as follows: Actuating-bars 46 are pivoted to the ends of the emergency-brake-operating lever B', extending in opposite directions from said lever or in direction of the ends of the car, and these auxiliary controlling-bars are made to pass loosely through guides or hangers 47, attached to and extending downward from the bottom of the car, as is shown in Fig. 2. Springs 48 are coiled around these auxiliary controlling-bars 46, having bearing against the inner hangers 47 and against collars 49, secured on the said bars. From each end of the emergency-brake-operating lever B' connecting-rods 50 also pivotally extend in opposite directions or in direction of the ends of the car, and at the outer end of each of these connecting-rods 50 a chain 51 is attached. These connecting-rods 50 are controlled usually by the device shown in Figs. 3 and 4. One of such devices is located on each platform convenient to the brake-shaft, also carried by the platform. These devices for controlling the emergency power on the brakes consist each of a drum 52, having ratchet-wheels 53 at each side, and the chains 51, the chains being adapted to be wound upon the drum between the ratchet-wheels, and the said drum is secured to a shaft 54, mounted to turn in hangers 55, extending downward from the bottom of a platform A'. A hand-lever 56 extends down through a suitable opening in the platform. The lower portion 57 of this hand-lever is forked, and the members of the bifurcated end of the lever are loosely mounted on the shaft 54, one at each side of the drum 52, as is shown in Fig. 4. A thumb-latch 58 is suitably pivoted to the hand-lever 56, which thumb-latch terminates at its lower end in a pawl 59 of sufficient width to engage simultaneously with the teeth of both of the ratchet-wheels 53, as is also shown in Fig. 4.

In operation when the emergency mechanism is to be rendered entirely independent in its action with reference to the main brake-applying mechanism the chain 51 is wound up on one of the drums 52, which is accomplished by moving one of the hand-levers 56 backward and forward, the pawl 59 of the said hand-lever then acting as a dog. It may happen, however, that the hand-lever 56 may be released at a moment when the pawl 59 is not in engagement with the teeth of the ratchet-wheel 53, thus permitting the chain 51, previously wound up, to be released and the emergency power applied to the brake-shoes when not needed. To overcome such a possibility, a pawl 60 is pivoted in the platform, extending downwardly therefrom and having rocking motion upon its pivot, which pawl at its upper end and above the platform is provided with a foot-plate 61. Thus each time that the hand-lever 56 is carried backward to obtain another grip for the pawl 59 to again turn the drum 52 if the operator presses downward upon the plate 61 the pawl 60, pivoted in the platform, will be carried over the ratchet-teeth of the drum and will effectually prevent the said drum from turning until the pawl 60 is again relieved from pressure. Communication is established between the mechanism for applying the emergency power and the brake-shoes and the mechanism for applying the brakes in the ordinary way through the medium of chains 62, which, as is shown in Fig. 2, connect the emergency-brake-operating lever B' at points near its ends with the inner end portions of the actuating-rods 21 and 22 for the main brake mechanism. It will thus be observed that the main-brake mechanism can be applied as ordinarily and operated entirely independent of the operation of the emergency-brake mechanism and that the emergency-brake mechanism may be brought into action at any time to add the force of its springs 48, which are stronger than the springs 45, to the mechanism which acts directly on the brake-shoes to apply the same. It is also evident that I have made a marked departure in the construction of a brake mechanism for cars, inasmuch as my brake-shaft is wound up in order to free the brake-shoes from the wheels and is released to apply the brake mechanism, which is suitably spring-controlled. Thus it will be observed that the brake-shoes may be released at leisure, but can be instantly applied to the wheels when occasion may demand.

In the modified form of the invention shown in Figs. 5 and 6 the construction differs but slightly from that shown in the other figures of the drawings, the only practical difference being that the springs, which are placed under tension when the brake-shoes are carried from the wheels in the operation of the main brake mechanism, are located upon the trucks instead of being located beneath the body of the car and independent of the trucks. To that end the brake-shoes 63 are pivotally suspended by links 64, which links are pivoted to posts 65, extending up from the sides of the truck, and a lever 66 is pivoted between opposing brake-shoes at each side of the truck, the pivots 67 of the levers 66 being between their lower ends and their centers. These levers 66 correspond to the levers 28, which act directly on the brake-shoes, and are best shown in Fig. 1. Connecting-rods 68 are pivoted one to each brake-shoe 63, and the said connecting-rods 68 at their inner ends are provided with loops, as is shown in Fig. 6, so as to provide for more or less lost motion. These loops receive pins 68$^a$, which are located one at each side of the pivot-point of each lever 66. The connecting-rods 68 pass through suitable guides 69, attached to the inner side faces of the truck, and springs 70, corresponding to the springs 45, (shown in Fig. 2,) are coiled around the connecting-rods 68, having engagement at one end against the bearings 69 and at the opposite end against collars 71, which are secured upon the connecting-rods. The operation of the device under this construction and location of the main springs is identical with that which has been described with reference to the construction illustrated in the other views.

Having thus described my invention, I claim as new and desire to secure by Letters Patent—

1. A car provided with a main and a supplemental or emergency brake mechanism, the main brake mechanism being adapted to be used independently of the supplemental or emergency brake mechanism, a tension device for the main brake mechanism for normally setting the brakes, a connection between the supplemental brake mechanism and the main brake mechanism, and a tension device for the supplemental brake mechanism for aiding the main brake mechanism in setting the brakes, as set forth.

2. A brake apparatus for cars, comprising a main brake mechanism, brake-shoes in direct operative connection with the said main brake mechanism, springs forming part of the main brake mechanism for setting the brakes, operating devices for releasing the brakes, means for locking said devices in the released position of the brakes, a supplemental brake mechanism connected with the main brake mechanism, springs forming part of the supplemental brake mechanism and adapted when brought into action to aid the main brake mechanism in setting the brakes, operating devices for moving the supplemental brake mechanism to release the brakes, and means for locking the said operating devices in the released position of the brakes, substantially as described.

3. A car provided with a main and a supplemental or emergency brake mechanism, the main brake mechanism being adapted to be used independently of the supplemental or emergency brake mechanism, and the supplemental or emergency brake mechanism being adapted to be used in connection with the main brake mechanism, a pliable connection between the two brake mechanisms, brake-shoes in direct operative connection with the main brake mechanism only and tension devices forming a part of each brake mechanism and contracted when the mechanism is operated to release the brakes, the said tension devices automatically expanding to apply the brake-shoes when the operating devices are released, as set forth.

4. A car provided with a main and a supplemental or emergency brake mechanism, the main brake mechanism being adapted to be used independently of the supplemental or emergency brake mechanism, and the supplemental or emergency brake mechanism being adapted to be used in connection with the main brake mechanism, a pliable connection between the two brake mechanisms, brake-shoes in direct operative connection with the main brake mechanism only, a separate operating device for each brake mechanism, locking devices for the brake-operating devices, and tension devices forming a portion of each brake mechanism, contracted when the operating devices are manually operated to release the shoes, which tension devices automatically expand to apply the brake-shoes when the operating devices are released, substantially as described.

5. In a brake apparatus for cars, a main brake mechanism, comprising a lever mounted transversely of the bottom of the car, brake-yokes mounted at the ends of the car and movable toward and from said ends, brake-shoes in operative connection with the said brake-yokes, actuating-rods connected with the said lever at opposite sides of its pivotal support, and with said brake-yokes, controlling-bars connected with the said lever at the opposite sides of its pivotal support, and provided with springs which operate to pull them toward the opposite ends of a car, operating devices mounted at the ends of the car, and shifting devices for the lever, connecting the said lever with the said operating devices, for the purpose described.

6. In a brake apparatus for cars, a main brake mechanism having brake-shoes normally applied by springs, operating-shafts mounted in the opposite end platforms of the car and adapted to release the brake-shoes, locking devices for the operating-shafts, and a supplemental brake mechanism, having springs by which the power thereof is normally applied to the said brake-shoes, the said supplemental brake mechanism being in limited yielding connection with the main brake mechanism, drums at opposite platforms of the car, means for operating the said drums, and connections, substantially as described, between said drums and the supplemental brake mechanism, as set forth.

7. In a brake apparatus for cars, a main brake mechanism comprising a lever mounted transversely of the bottom of a car, brake-yokes mounted at the ends of the car and movable toward and from said ends, brake-shoes in operative connection with said brake-yokes, actuating-rods connected with said lever at opposite sides of its pivotal support and with said brake-yokes, controlling-bars connected with said lever at the opposite sides of its pivotal support and provided with springs which operate to pull them toward opposite ends of a car, brake-shafts mounted on the platforms of the car, connections between the ends of the lever and said brake-shafts, and a supplemental brake mechanism, comprising another lever mounted transversely of the bottom of the car below the first-named lever, flexible connections between the first-named lever at opposite sides of its pivotal support and the actuating-rods which connect the first-named lever with the brake-yokes, controlling-bars connected with the lever of the supplemental brake mechanism at the opposite sides of its pivotal support, which controlling-bars are provided with springs arranged to pull them in direction of the opposite ends of the car, ratchet-drums mounted upon the platforms of the car, devices for operating the said ratchet-drums, and connections, substantially as shown and described, between the ends of the lever of the supplemental brake mechanism and the said ratchet-drums, as described.

In testimony whereof I have signed my name to this specification in the presence of two subscribing witnesses.

WILLIAM SHIPMAN HOWLAND.

Witnesses:
J. F. COULTER, Jr.,
LEVI P. MILLER.